US008612580B2

(12) United States Patent
Gandhi et al.

(10) Patent No.: US 8,612,580 B2
(45) Date of Patent: Dec. 17, 2013

(54) DISTRIBUTED COMPUTING FRAMEWORK

(75) Inventors: Niraj Girishkumar Gandhi, Redmond, WA (US); Kenneth Van Hyning, Snoqualmie, WA (US); Jinghao Liu, Redmond, WA (US); Kyle Allen Larsen, Bonita Springs, FL (US)

(73) Assignee: Microsoft Corporation, Redmond, WA (US)

( * ) Notice: Subject to any disclaimer, the term of this patent is extended or adjusted under 35 U.S.C. 154(b) by 220 days.

(21) Appl. No.: 13/149,625

(22) Filed: May 31, 2011

(65) Prior Publication Data

US 2012/0311570 A1 Dec. 6, 2012

(51) Int. Cl.
*G06F 9/46* (2006.01)

(52) U.S. Cl.
USPC .......................................... 709/224; 718/101

(58) Field of Classification Search
USPC .................... 709/224–227; 718/1–5
See application file for complete search history.

(56) References Cited

U.S. PATENT DOCUMENTS

| | | | | |
|---|---|---|---|---|
| 4,912,628 | A * | 3/1990 | Briggs | 718/100 |
| 6,065,039 | A | 5/2000 | Paciorek | |
| 7,515,899 | B1 | 4/2009 | Carr et al. | |
| 7,548,977 | B2 | 6/2009 | Agapi et al. | |
| 7,617,500 | B2 * | 11/2009 | Astl et al. | 719/311 |
| 2002/0129126 | A1 | 9/2002 | Chu et al. | |
| 2006/0136911 | A1* | 6/2006 | Robinson et al. | 718/1 |
| 2006/0224741 | A1* | 10/2006 | Jackson | 709/226 |
| 2007/0050484 | A1* | 3/2007 | Oertig et al. | 709/220 |
| 2008/0115143 | A1* | 5/2008 | Shimizu et al. | 718/105 |
| 2008/0160974 | A1 | 7/2008 | Vartiainen et al. | |
| 2012/0284713 | A1* | 11/2012 | Ostermeyer et al. | 718/1 |
| 2012/0311560 | A1* | 12/2012 | Dobrovolskiy et al. | 717/174 |

FOREIGN PATENT DOCUMENTS

WO  2005-109829  11/2005

OTHER PUBLICATIONS

Prithwish Basu et. al., A Novel Approach for Execution of Distributed Tasks on Mobile Ad Hoc Networks, Mar. 2002, (pp. 579-585).
Prithwish Basu et. al., A New Task—Based Approach for Supporting Distributed Applications on Mobile Ad Hoc Networks, Mar. 29, 2011 (Retrieved Date), (1 page).
Stan Kurkovsky et. al., A Collaborative Problem—Solving Framework for Mobile Devices, Apr. 2-3, 2004, (6 pages).
Stanislav Kurkovsky et. al., Wireless Grid Enables Ubiquitous Computing, Mar. 29, 2011 (Retrieved Date), (8 pages).

(Continued)

*Primary Examiner* — Chirag R Patel
(74) *Attorney, Agent, or Firm* — Workman Nydegger (57) ABSTRACT

Embodiments are directed to distributing processing tasks from the reduced-performance computer system to at least one other computer system, to processing, at one computer system, a distributed task received from a reduced-performance computer system, and to establishing a simulation environment for testing distributed computing framework functionality. In an embodiment, a reduced-performance computer system monitors computing tasks to determine a processing resource usage level for each task. The computing tasks are part of a software application that is running on the reduced-performance computer system. The reduced-performance computer system determines that one of the monitored tasks is using processing resources beyond a specified threshold level. The reduced-performance computer system sends the task to another computer system that receives, processes and returns the results of the tasks to the reduced-performance computer system. The reduced-performance computer system presents the processed results received from the other computer system within the running software application.

20 Claims, 5 Drawing Sheets

(56) References Cited

OTHER PUBLICATIONS

Stan Kurkovsky et. al., Modeling a Grid—Based Problem Solving Environment for Mobile Devices, Apr. 5-7, 2004, (2 pages).

M. Lee Son et. al., A Model for Collaboration Services between Mobile Devices, Apr. 18, 2006, (5 pages).

Iulian Radu et.al., NEMOS: Service Architecture for Lightweight Mobile Devices, Mar. 29, 2011 (Retrieved Date), (5 pages).

Fangzhe Chang et al., A Framework for Automatic Adaptation of Tunable Distributed Applications, Mar. 29, 2011 (Retrieved Date), (15 pages).

* cited by examiner

DISTRIBUTED COMPUTING FRAMEWORK

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

Increasingly, these software applications are being run on smaller, reduced-performance computing devices such as mobile phones, netbooks and tablets. These smaller, more mobile devices are often limited in their processing power by smaller central processing units (CPUs), less memory and battery life concerns. As a result, CPU-intensive software applications are typically not implemented on these devices, and are reserved for larger, typically stationary devices. Consequently, developers of applications for reduced-performance devices limit the features they include in their applications.

BRIEF SUMMARY

Embodiments described herein are directed to distributing processing tasks from a reduced-performance (mobile) computer system to a host computer system, to processing a distributed task received from a reduced-performance computer system and to establishing a simulation environment for testing distributed computing framework functionality. In one embodiment, a reduced-performance computer system monitors computing tasks to determine a processing resource usage level for each task. The computing tasks are part of a software application that is running on the reduced-performance computer system. The reduced-performance computer system determines that one of the monitored tasks is using processing resources beyond a specified threshold level. The reduced-performance computer system sends the task to another computer system that receives, processes and returns the results of the tasks to the reduced-performance computer system. The reduced-performance computer system presents the processed results received from the other computer system within the running software application.

In another embodiment, a host computer system receives from a reduced-performance computer system various software application tasks that are to be processed. The host computer system establishes a virtual execution environment for processing the received tasks. The virtual execution environment operates in an isolation boundary that is isolated from the rest of the computer system. The host computer system processes the received tasks in the established virtual execution environment and sends the results of the processed tasks to the reduced-performance computer system.

In yet another embodiment, a computer system establishes a simulation environment that allows testing of distributed applications. The simulation environment allows developers to test their application on their own computer system before deploying the application. The computer system initiates simulation of a host computer system and a reduced-performance computer system, and performs the following in the simulation environment: monitors computing tasks on the reduced-performance computer system to determine a processing resource usage level for each task, determines that at least one of the monitored tasks is using processing resources beyond a specified threshold level, sends the determined task to a different computer system that receives and processes the task in a virtual execution environment and returns the results of the tasks to the reduced-performance computer system, and presents the processed results within the running software application.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Embodiments described herein are directed to distributing processing tasks from a reduced-performance (mobile) computer system to a host computer system, to processing a distributed task received from a reduced-performance computer system and to establishing a simulation environment for testing distributed computing framework functionality. In one embodiment, a reduced-performance computer system monitors computing tasks to determine a processing resource usage level for each task. The computing tasks are part of a software application that is running on the reduced-performance computer system. The reduced-performance computer system determines that one of the monitored tasks is using processing resources beyond a specified threshold level. The reduced-performance computer system sends the task to another computer system that receives, processes and returns the results of the tasks to the reduced-performance computer system. The reduced-performance computer system presents the processed results received from the other computer system within the running software application.

In another embodiment, a host computer system receives from a reduced-performance computer system various software application tasks that are to be processed. The host computer system establishes a virtual execution environment for processing the received tasks. The virtual execution environment operates in an isolation boundary that is isolated from the rest of the computer system. The host computer system processes the received tasks in the established virtual execution environment and sends the results of the processed tasks to the reduced-performance computer system.

In yet another embodiment, a computer system establishes a simulation environment that allows testing of distributed applications. The computer system initiates simulation of a host computer system and a reduced-performance computer system, and performs the following in the simulation environment: monitors computing tasks on the reduced-performance computer system to determine a processing resource usage level for each task, determines that at least one of the monitored tasks is using processing resources beyond a specified threshold level, sends the determined task to a different computer system that receives and processes the task in a virtual execution environment and returns the results of the tasks to the reduced-performance computer system, and presents the processed results within the running software application.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmissions media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

Figure 1:
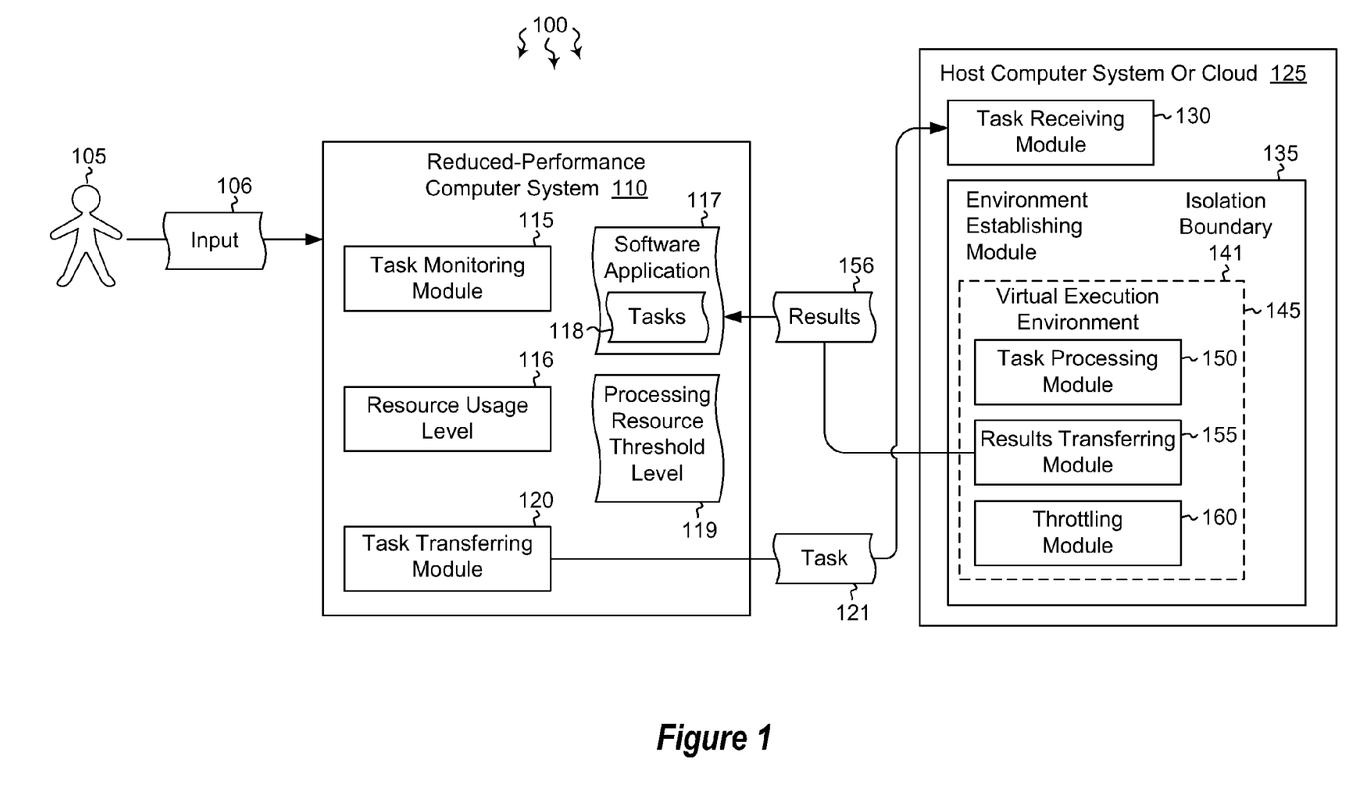
FIG. 1 illustrates a computer architecture in which embodiments of the present invention may operate including distributing processing tasks from the reduced-performance computer system to at least one other computer system.

FIG. 1 illustrates a computer architecture 100 in which the principles of the present invention may be employed. Computer architecture 100 includes two different computer systems. Reduced-performance computer system 110 may be any type of netbook, tablet, smartphone or other mobile or battery-operated computer system that, for one reason or another, has less processing power than a typical desktop or laptop computer system. Such reduced-performance devices have processing resources that are limited by various constraints such as size, battery life, cost, heat or other considerations. The differences between a reduced-performance computer system and a normal desktop, laptop or enterprise computer system will be recognized by one skilled in the art. Host computer system 125 is a normal- or high-performance computer system (or cluster of computer systems). Host computer system 125 may be a home desktop or laptop computer system, a corporate workstation or even a backend data server. Substantially any computing system with available processing resources may be used for host computer system 125.

Both computer systems illustrated in FIG. 1 may include various modules for accomplishing specific tasks. For example, task monitoring module 115 may be used to monitor various tasks 118 that are being executed or are scheduled for execution as part of a software application 117. Task transferring module 120 may transfer these tasks from the reduced-performance computer system to the host computer system. The tasks may be transferred when the resource usage level 116 is too high. For instance, if a processing resource threshold level has been set (e.g. 119), and if that threshold level is being exceeded, one or more tasks may be transferred (e.g. transferred task 121) to task receiving module 130 of computer system 125. Environment establishing module 135 may establish a virtual execution environment 145 (VEE) that has its own modules for performing functions.

The VEE may utilize existing computing resources on host computer system 125. The VEE provides an isolated environment (e.g. isolation boundary 141) for processing received tasks. Moreover, the VEE includes a throttling module 160 that allows the computer system to throttle its capability and only contribute in distributed work load when idle. The VEE can be established on substantially any computer system, and can process tasks from substantially any type of software application. In some cases, the VEE may be a virtual machine.

The virtual execution environment is a light weight environment which provides logical context and creates a separate security domain with the host operating system (OS). Tasks received from a reduced-performance computer system may be executed within the VEE. The VEE may provide separation and complete isolation from the host OS. Thus, upon closure of the VEE, substantially no trace is left behind on the host computer system. Binaries and parent, child or orphaned processes corresponding to the tasks are executed within the isolation boundary 141 of the VEE; thus, when the host operating system's native operations start, or when the host computer system is removed from participation, its easy to clean and just stop or remove VEE.

The VEE may communicate with external web resources process data and provide the results 156 of the execution by way of results transferring module 155 to the device 110. In many situations, the host computer system has higher network bandwidth than the mobile device. In such situations, network traffic of the software application may be pushed to the VEE. For instance, if a user needs to read a large document on their mobile device, instead of downloading the entire, document on the mobile device, the document could be downloaded on the VEE. The VEE may then serve the mobile device one screen of content at a time which may save disk space and battery, and may result in a faster overall download time.

In cases where the reduced-performance computer system 110 is capable of running virtualization software, the environment establishing module 135 may establish a virtual machine to process received tasks. Any received tasks are then processed by the virtual machine. In this manner, the tasks may be processed in an isolated manner, without affecting the underlying host OS.

A task execution runtime (TER) may be running on the host computer system. The TER may be configured to detect the processing capabilities of the host OS. For example, in some cases the TER may determine whether the host computer system has virtualization capabilities and, if it does, (and if the user 105 opts for it), then the distributed tasks are executed within a virtual machine (VM). Alternatively, the TER may determine that the host computer system has at least some idle or other processing resources that could be used to process distributed tasks. The TER may use these processing resources to establish the virtual execution environment, including the isolation boundary separates the distributed task execution and the host computer system's own operations. The TER may govern the execution of tasks on the host computer system. The TER may detect CPU and other processing resource utilization of native tasks and of distributed task. The TER may then throttle (at module 160) resource utilization by the virtual machine or VEE accordingly to minimize any side effects. For example, if the host computer system begins processing another local task, it may throttle processing of the distributed tasks.

A similar runtime environment may be implemented on the reduced-performance computer system. A task initiation runtime environment (TIRE) may be implemented which uses the different modules to perform specific tasks. The TIRE component may be specifically designed for mobile and other reduced-performance devices. The TIRE component may thus be light weight and may be integrated into the kernel of the mobile device's OS. It may perform task scheduling and may assign tasks to the TER based on its current capacity. TIRE may allow administrators to input binaries at runtime while TIRE interprets them and does the task distribution.

In some cases, a software development kit (SDK) may be provided that allows developers to develop applications that run on reduced-performance computer systems while offloading much of the processing to a host computer system. The SDK may include or provide a set of methods that allow parallelism among tasks through declarative and conventional programming. Using the SDK, dynamic scheduling and adjusting task scheduling may be provided. In some embodiments, a simulation environment may be provided in which developers may test applications built for the above-described computing environment, before the applications are deployed. This and the other concepts mentioned above will be explained in greater detail below with regard to methods 200, 300 and 400 of FIGS. 2, 3 and 4.

Figure 2:
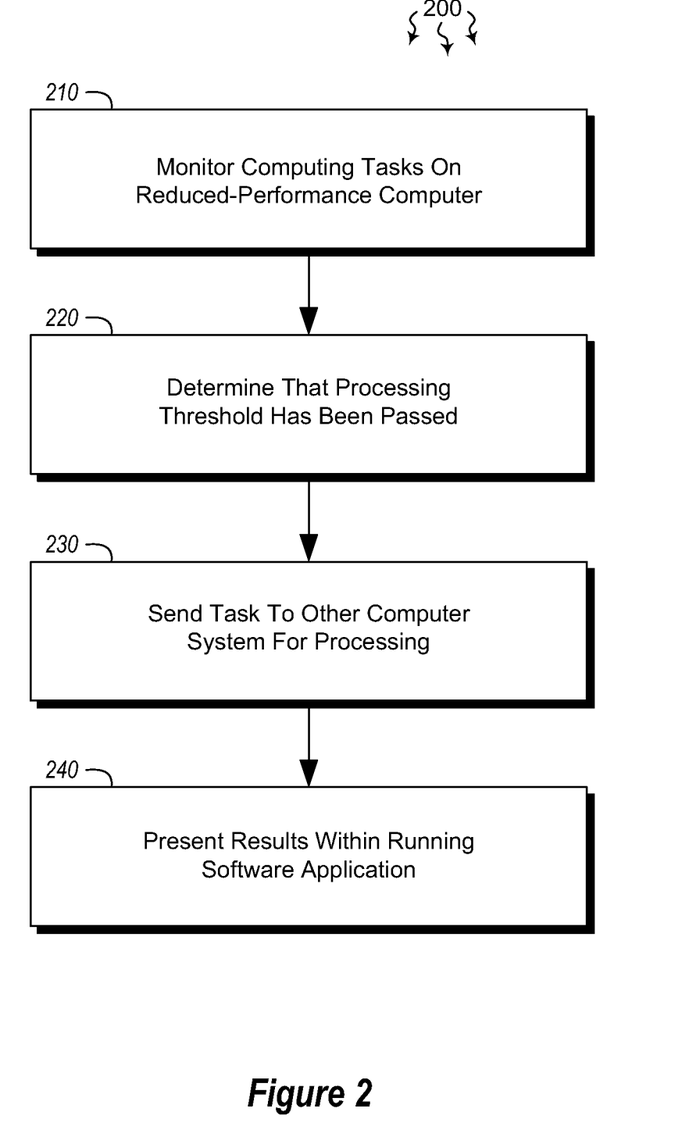
FIG. 2 illustrates a flowchart of an example method for distributing processing tasks from the reduced-performance computer system to at least one other computer system.
Figure 3:
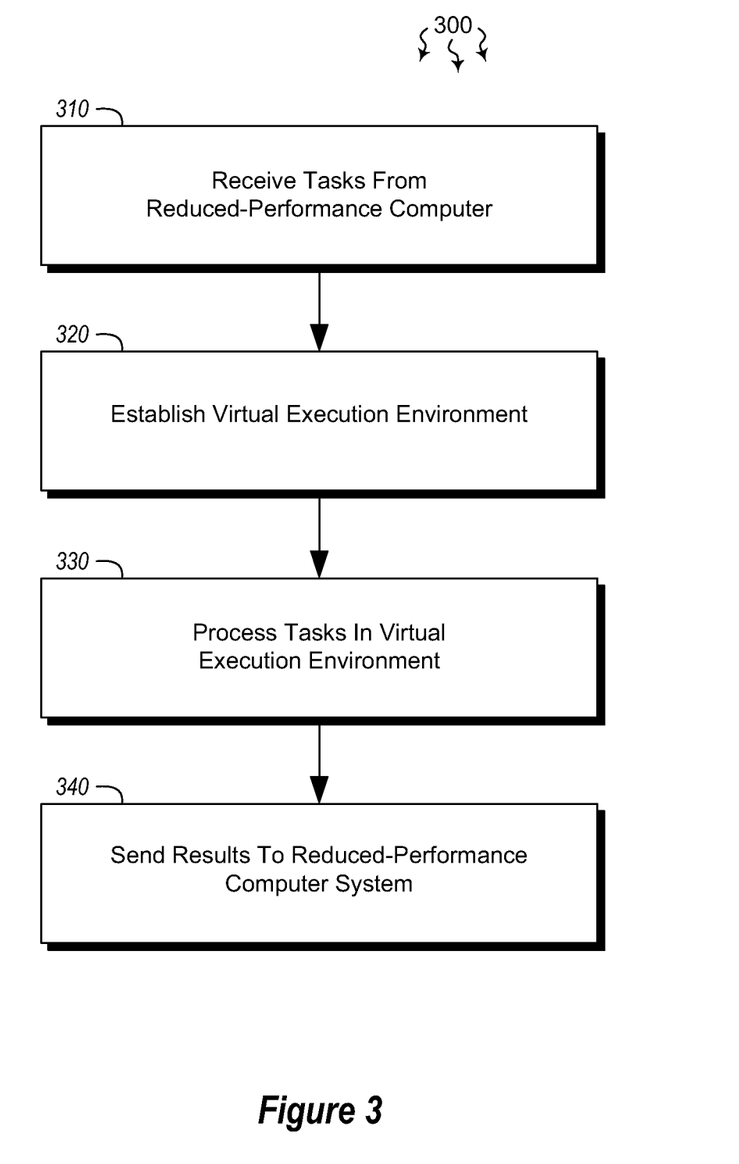
FIG. 3 illustrates a flowchart of an example method for processing, at one computer system, a distributed task received from a reduced-performance computer system.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for distributing processing tasks from the reduced-performance computer system to at least one other computer system. The method 200 will now be described with frequent reference to the components and data of environment 100.

Method 200 includes an act of monitoring one or more computing tasks on a reduced-performance computer system to determine a processing resource usage level for each task, wherein the computing tasks are part of a software application running on the reduced-performance computer system (act 210). For example, as part of the task initiation runtime environment (TIRE), the task monitoring module 115 may monitor tasks 118 that are part of a software application 117. The software application may be any type of software function, service, application program or other portion of software functionality. The software application may perform many discrete tasks. In this environment (100), one or more of the tasks of the application may be sent to another computer system for processing.

The task monitoring module may determine a resource usage level 116 for the reduced-performance computer system 110. The resource usage level may indicate how many processing resources are being used and at what level or percentage. For example, the resource usage level may indicate a CPU usage percentage, a RAM usage percentage, a network usage percentage, a battery usage percentage or the usage of any other processing component.

Method 200 includes an act of determining that at least one of the monitored tasks is using processing resources beyond a specified threshold level (act 220). For example, task monitoring module 115 may determine that one or more of monitored tasks is using a large portion of processing resources. If that portion is beyond a specified threshold level (e.g., CPU usage is above 80% for a certain period of time), task transferring module 120 may be used to send the determined task to host computer system 125 (act 230). The host computer system may be configured to receive, process and return the results of the tasks to the reduced-performance computer system (this will be explained below in FIG. 3). The task transferring module may divide the task into multiple different portions for processing in the virtual execution environment. The size of the portions may be dynamically adjusted based on various considerations including the current strength of the mobile device's network signal, the size of the task to be processed or the priority level of the task. Thus, for instance, if the mobile device currently has a high signal strength, an optimal packet size may be used to transmit the maximum amount of data for that signal strength.

In some cases, the task portions are transferred, processed and returned in a seamless manner. In such cases, the task may appear to have been processed on the reduced-performance computer system. The user may be unaware in these circumstances that some of the application tasks were processed on a different computer system. Thus, for example, a user may be playing a game on the reduced-performance computer system. The individual tasks of the game may be selectively sent to another computer system, processed and returned to the reduced-performance computer system while the game is being played. The processed results of the task are seamlessly incorporated into the game. Thus, games (or other applications) that ordinarily could not have been played on the reduced-performance computer system due to processing resource limitations can be played, as the majority of the processing is occurring on another computer system.

For example, if a user was playing chess, and the chess program wanted to analyze a chess move, the "best move" computation may be sent to a datacenter, to the user's home desktop machine or even to an unrelated user's home desktop machine. Moreover, in some cases, the computation could be split and sent to a large number of reduced performance devices. For some problems, such as the chess "best move" example, the computation may be split into thousands of very simple problems that a single device can push out to other devices and then easily combine the results to select the answer. In cases where battery life is a concern, battery usage may be reduced by restricting the acceptance of these divided tasks to only the times that the device is receiving power from a charger. This has the effect of making a large number of plugged-in reduced performance devices act effectively as a super computer without impacting the battery life of those devices.

In some embodiments, the number of tasks transferred from the reduced-performance computer system to the host computer system is dynamically adaptable. Adaptations in the number of tasks transferred may be based on the current processing conditions of the host computer system 125. Thus, if the host computer system is currently using a large portion of computing resources, the reduced-performance computer system may send less tasks to the host computer system (and may possibly send the tasks to another host computer system). As mentioned above, the reduced-performance computer system may present the processed results received from the host computer system within the running software application (act 240). This may be performed seamlessly to where the user 105 is unaware that portions of the software application are being processed elsewhere.

To make further use of the system described above, a generic application development framework may be provided. The generic application development framework may allow developers to develop software applications that operate on reduced-performance computer systems and transfer software application tasks to one or more other computer systems. The generic application development framework may integrate with one or more existing application development programs. Thus, using existing application development programs (i.e. integrated development environments (IDEs)), along with the generic application development framework, a developer may develop applications that run on reduced-performance computer systems (e.g. mobile phones or tablets) and transfer large portions of application processing to other computer systems better able to handle the processing load. The actions occurring on the host computer system will be described below in regard to FIG. 3.

FIG. 3 illustrates a flowchart of a method 300 for processing, at a host computer system, a distributed task received from a reduced-performance computer system. The method 300 will now be described with frequent reference to the components and data of environment 100.

Method 300 includes an act of receiving from a reduced-performance computer system one or more software application tasks that are to be processed (act 310). For example, task receiving module 130 may receive from reduced-performance computer system 110 a task 121 that is to be processed at the host computer system 125. Many such tasks may be received and buffered by the task receiving module. The tasks may be received singly or as groups. In some cases, the tasks may be streamed to the host computer system. The processed results 156 may likewise be streamed back to the reduced-performance computer system. The tasks may be broken down into sub-tasks, and even further sub-tasks. This division of tasks may be used in situations where the reduced-performance computer system has low signal strength or is connected to a low-bandwidth network.

Method 300 also includes an act of establishing a virtual execution environment for processing the received tasks, wherein the virtual execution environment operates in an isolation boundary that is isolated from the rest of the host computer system (act 320). For example, environment establishing module 135 may establish virtual execution environment (VEE) 145 in isolation boundary 141. As mentioned above, the isolation boundary may be a virtual boundary in which the processing of tasks is performed. The task processing module 150 processes the tasks solely within the isolation boundary; the task processing module does not have access to data stored outside the boundary. In this manner, the VEE can be established securely, on substantially any computer system, as the VEE does not have access to files stored on the host computer system. Moreover, the isolation boundary prevents task execution in the VEE from affecting the operating system or other programs running on the host computer system. Thus, viruses and other malware are prohibited from causing any damage to host system programs. Thus, the VEE is a secure, isolated environment inaccessible by other software applications of the host system.

In some cases, the VEE may be a virtual machine. Some host systems may be configured to work especially well with virtual machines. In such systems, multiple virtual machines may be established by module 135 to processes the incoming tasks. Each virtual machine may be established to process tasks related to certain applications. Once the application is closed on the reduced-performance computer system, or once a scheduled time has arrived (e.g. as part of a processing schedule), the virtual machine (or the normal virtual execution environment) is removed from the host computer system without leaving a record of its existence. Because the VEE was established in an isolation boundary, other programs of the host system have not been interacting with the VEE, and cleanup is simply a matter of removing the files and data structures that made up the VEE.

Method 300 further includes an act of processing the received tasks in the established virtual execution environment (act 330). For example, task processing module 150 may process the incoming tasks 121 within VEE 145. The processing may be limited or throttled in some instances. For example, throttling module 160 may detect that the host computer system is processing a certain type of task (e.g. a critical or high-importance task), or is otherwise using a large portion of its processing resources. In response, the throttling module 160 may postpone the processing of tasks received from the reduced-performance computer system until the critical task has finished processing or until processing resources are at an acceptable level. The VEE may further notify the reduced-performance computer system that task processing has been temporarily postponed, and that the tasks may need to be sent to another VEE or to another computer system.

In some embodiments, the VEE may be configured to monitor the processing resources of the host computer system and dynamically throttle the processing of received tasks. In some cases, this dynamic throttling may not occur until the VEE determines that the host system is using its processing resources above a specified threshold level. Thus, once that level is reached, tasks scheduled for processing in the VEE are postponed or moved to another computer system. In cases where tasks are paused or otherwise postponed due to throttling, these tasks may be resumed after the VEE has detected that the host computer system has sufficient processing resources.

The results 156 of the VEE's task processing may be sent to the reduced-performance computer system 110 (act 340). The results may be sent substantially immediately after processing. In this manner, the results may be presented to the user 105 as part of the user's application. Thus, the user may open an application (e.g. using input 106) on his or her mobile or tablet device, have the application processing (substantially) performed on his or her home computer system, and view the results in the application 117 as if the reduced-performance computer system had done all the processing. The results may be streamed to the mobile device 110 and seamlessly incorporated into the application the user is using.

In some cases, while the VEE is processing a task that is part of a first application, the VEE may receive a second task that is to be processed at the VEE, while the first task is being processed. The host computer system may determine that the second received task is part of the same software program as the first received task and may process the second task in the same virtual execution environment. In other cases, the VEE may be processing a task that is part of a first application, and then receive a second task that is to be processed at the VEE, while the first task is being processed. The host computer system may determine that the second received task is part of a different software program than the first received task and may establish a second, different VEE to process the second received task. Thus, multiple different virtual execution environments may be established to process tasks received from different software applications.

Figure 4:
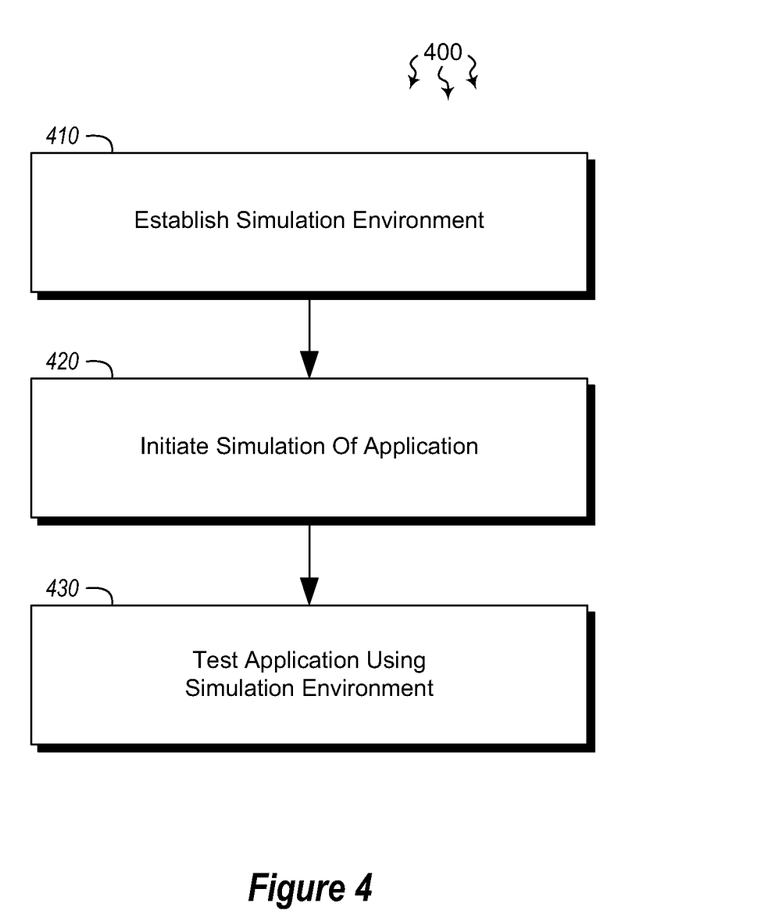
FIG. 4 illustrates a flowchart of an example method for establishing a simulation environment for testing distributed computing framework functionality.

FIG. 4 illustrates a flowchart of a method 400 for establishing a simulation environment for testing distributed computing framework functionality. The method 400 will now be described with frequent reference to the components and data of environments 100 and 500 of FIGS. 1 and 5, respectively.

Figure 5:
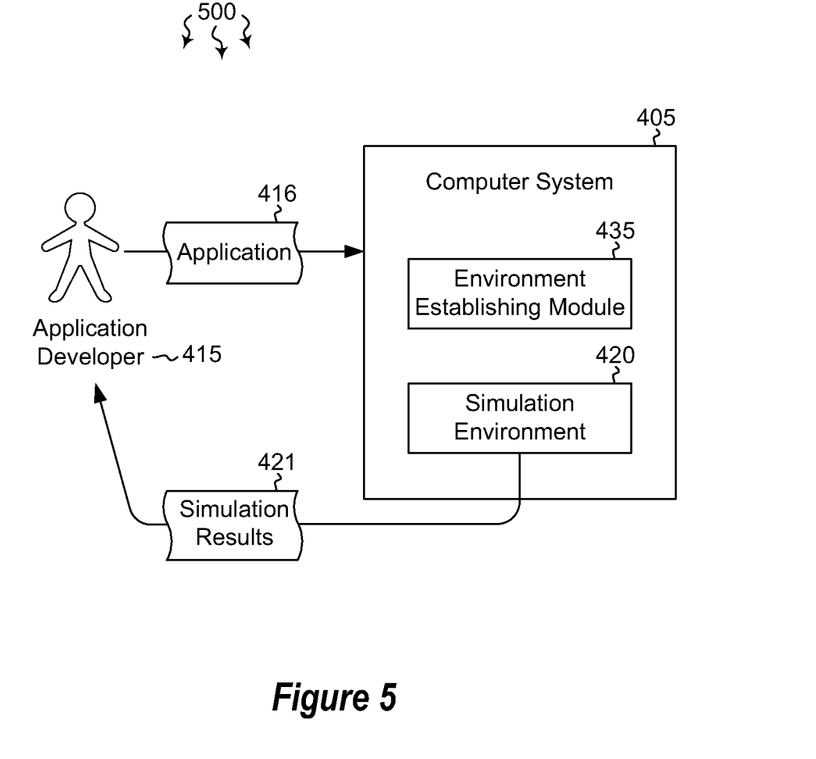
FIG. 5 illustrates a computer architecture in which a simulation environment for testing distributed computing framework functionality is established.

Method 400 includes an act of establishing a simulation environment configured to allow testing of distributed applications (act 410). For example, environment establishing module 435 may establish a simulation environment 420 that allows testing of distributed applications. Developers 415 may thus write applications 416 designed to operate on the reduced-performance computer system 110 and test them in the simulation environment on computer system 405. The applications 117, as above, are distributed applications that can offload some of their tasks 118 to other computer systems. The simulation environment may be customizable to simulate corporate or enterprise environments, home environments, or other computing environments. In some cases, the simulation environment may allow multiple virtual execution environments to be established and run simultaneously to process tasks from multiple different software applications. In some cases, the simulation environment may provide application execution plus VEE (or VM), TER and/or TIR on the same machine (405) so that the above-described distributed applications can be developed and tested. After the number and type of environments has been selected, the environment establishing module may initiate the simulation (act 420).

Method 400 further includes an act of performing various steps in the established simulation environment (act 430), including one or more of the following: monitoring computing tasks 118 on the reduced-performance computer system 110 to determine a processing resource usage level 116 for each task, where the tasks are part of a software application 117 running on the reduced-performance (mobile) system, determining that at least one of the monitored tasks is using processing resources beyond a specified threshold level 119, sending the determined task 121 to a host computer system 125 that receives and processes the task in a virtual execution environment 145, and returns the results 156/421 of the tasks to the reduced-performance computer system, and presenting the processed results received from the host computer system within the running software application. The tasks are processed securely in an isolated environment and are returned to the user's application, without the user's knowledge. The simulation environment may thus allow a developer to simulate and test applications, before actually deploying the applications.

Accordingly, methods, systems and computer program products are provided which distribute application tasks from a reduced-performance (mobile) computer system to a host computer system. Moreover, methods, systems and computer program products are provided which process, at a host computer system, a distributed task received from a reduced-performance computer system, and establish a simulation environment for testing distributed application functionality.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A computer-implemented method for distributing to a host computer system one or more processing tasks from an application running at a mobile computing device in order to reduce resources required at the mobile computing device required to process one or more of the tasks, the host computing system being accessible to the mobile computing device through a network, the computer-implemented method comprising acts of:

monitoring at the mobile computing device one or more computing tasks of an application that is running on the mobile computing device;

as a result of the monitoring of the tasks running at the mobile computing device, determining a resource usage level required for processing each task being monitored;

comparing at the mobile computing device the resource usage level to a resource threshold level established for the tasks running at the mobile computing device, and identifying at least one of the monitored tasks as having a resource usage level required for processing that exceeds the resource threshold level;

sending the identified task to a host computer system for processing in a virtual execution environment that includes an isolation boundary that isolates the processing from the rest of the host computer system;

the mobile computing device receiving the task processed by the host computer system and presenting the processed results within the running software application without interruption of the running application.

2. The method of claim 1, wherein the identified task is divided into one or more portions for processing and at least of one said portions is sent for processing by a second host computer system.

3. The method of claim 2, wherein the task portions are transferred, processed and returned in a seamless manner, such that the task appears to have been processed on the mobile computing device without interruption of the running application.

4. The method of claim 1, wherein task portions transferred to the second host computer system is dynamically adaptable, based on current processing conditions of the second host computer system.

5. A computer program product for implementing a method for processing at a host computer system one or more processing tasks from an application running at a mobile computing device in order to reduce resources required at the mobile computing device required to process one or more of the tasks, the host computing system being accessible to the mobile computing device through a network, the computer program product comprising one or more physical memory devices having stored thereon computer-executable instructions that, when executed by one or more processors of the computing system, cause the computing system to perform the method, where the method comprises acts of:

receiving at a host computing system one or more tasks of a software application that is running on the mobile computing device, the one or more received tasks having been determined to exceed a resource threshold level for processing established at the mobile computing device;

generating at the host computer a virtual execution environment for processing the one or more received tasks, the virtual execution environment comprising an isolation boundary that isolates the processing performed by the virtual execution environment from the rest of the host computer system;

processing the one or more received tasks in the virtual execution environment; and sending the results of the one or more processed tasks back to the application running on the mobile computing device without interrupting the application.

6. The computer program product of claim 5, where the method further comprises acts of:

monitoring the processing resources of the host computer system; and dynamically throttling the processing of the received task upon determining that the host computer system is using its processing resources above a specified threshold level.

7. The computer program product of claim 6, where the method further comprises an act of transferring one or more of the received tasks to a second host computer system for processing.

8. The computer program product of claim 6, where the method further comprises acts of pausing at least one of the received tasks due to throttling and then restarting the execution of the paused task.

9. The computer program product of claim 5, wherein the virtual execution environment comprises a virtual machine.

10. The computer program product of claim 5, wherein the virtual execution environment is removed from the host computer system without leaving a record of its existence.

11. The computer program product of claim 5, wherein the virtual execution environment is stopped at a scheduled time as part of a processing schedule.

12. The computer program product of claim 5, where the method further comprises acts of:

detecting that the host computer system is processing a specified type of task;

postponing the processing of at least one of the received tasks; and notifying the mobile computing device that task processing has been postponed.

13. The computer program product of claim 5, where the method further comprises an act of processing all received tasks that are part of the same application within the same virtual execution environment.

14. The computer program product of claim 5, where the method further comprises acts of:

receiving at least one task that is to be processed at the host computer system that is from an application at the mobile computing device that is different than the application from which one or more other tasks were received; and generating at the host computer a second, different virtual execution environment to process the at least one task from the different application.

15. A computer-implemented method for distributed processing of one or more processing tasks from an application running at a mobile computing device in order to reduce resources required at the mobile computing device required to process one or more of the tasks, the computer-implemented method comprising acts of:

monitoring at the mobile computing device one or more computing tasks of an application that is running on the mobile computing device;

as a result of the monitoring of the tasks running at the mobile computing device, determining a resource usage level required for processing each task being monitored;

comparing at the mobile computing device the resource usage level to a resource threshold level established for the tasks running at the mobile computing device, and identifying at least one of the monitored tasks as having a resource usage level required for processing that exceeds the resource threshold level;

sending the identified task to a host computer system for processing;

receiving at a host computing system the identified tasks;

generating at the host computer a virtual execution environment for processing the received task, the virtual execution environment comprising an isolation boundary that isolates the processing performed by the virtual execution environment from the rest of the host computer system;

processing the received task in the virtual execution environment;

sending the results of the processed task back to the application running on the mobile computing device without interrupting the application; and the mobile computing device receiving the task processed by the host computer system and presenting the processed results within the running software application.

16. A computer program product for implementing a method for simulating distributed processing of one or more processing tasks from an application running at a mobile computing device in order to reduce resources required at the mobile computing device required to process one or more of the tasks, the computer program product comprising one or more physical memory devices having stored thereon computer-executable instructions that, when executed by one or more processors of the computing system, cause the computing system to perform the method, where the method comprises acts of:

generating at a computer system a simulation environment that simulates a mobile computing device and performing the following:

monitoring at the simulated mobile computing device one or more computing tasks of an application that is running on the simulated mobile computing device;

as a result of the monitoring of the tasks running at the simulated mobile computing device, determining a resource usage level required for processing each task being monitored;

comparing at the simulated mobile computing device the resource usage level to a resource threshold level established for the tasks running at the simulated mobile computing device, and identifying at least one of the monitored tasks as having a resource usage level required for processing that exceeds the resource threshold level;

generating at the computer system a simulation environment that simulates a host computer and performing the following:

receiving at the simulated host computing system the identified tasks;

generating at the simulated host computer a virtual execution environment for processing the received task, the virtual execution environment comprising an isolation boundary that isolates the processing performed by the virtual execution environment from the rest of the simulated host computer system;

processing the received task in the virtual execution environment;

sending the results of the processed task back to the application running on the simulated mobile computing device without interrupting the application; and the simulated mobile computing device receiving the task processed by the simulated host computer system and presenting the processed results within the running software application.

17. The computer program product of claim 16, wherein the simulation environment is generated by a generic application development framework that allows developers to develop software applications that operate on mobile computing devices and transfer software application tasks to one or more host computer systems.

18. The computer program product of claim 17 wherein the generic application development framework integrates with one or more existing application development programs.

19. The computer program product of claim 17, where the method further comprises an act of processing all received tasks that are part of the same application within the same virtual execution environment.

20. The computer program product of claim 17, where the method further comprises acts of:

receiving at least one task that is to be processed at the host computer system that is from an application at the mobile computing device that is different than the application from which one or more other tasks were received; and generating at the host computer a second, different virtual execution environment to process the at least one task from the different application.

* * * * *